(12) United States Patent
Kawamura et al.

(10) Patent No.: US 10,819,988 B2
(45) Date of Patent: Oct. 27, 2020

(54) MOVING IMAGE ENCODING APPARATUS, MOVING IMAGE DECODING APPARATUS, MOVING IMAGE ENCODING METHOD, MOVING IMAGE DECODING METHOD, AND COMPUTER READABLE STORAGE MEDIUM

(71) Applicant: KDDI CORPORATION, Tokyo (JP)

(72) Inventors: Kei Kawamura, Fujimino (JP); Sei Naito, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 66 days.

(21) Appl. No.: 15/899,585

(22) Filed: Feb. 20, 2018

(65) Prior Publication Data
US 2018/0176584 A1 Jun. 21, 2018

Related U.S. Application Data

(63) Continuation of application No. PCT/JP2016/069021, filed on Jun. 27, 2016.

(30) Foreign Application Priority Data

Aug. 25, 2015 (JP) .................. 2015-166051

(51) Int. Cl.
*H04N 19/82* (2014.01)
*H04N 19/86* (2014.01)
(Continued)

(52) U.S. Cl.
CPC ......... *H04N 19/182* (2014.11); *H04N 19/117* (2014.11); *H04N 19/119* (2014.11);
(Continued)

(58) Field of Classification Search
USPC ......................................... 375/240
See application file for complete search history.

(56) References Cited

U.S. PATENT DOCUMENTS 5,126,841 A * 6/1992 Tanaka .................. H04N 7/141
348/E7.078
5,530,561 A 6/1996 Shimazaki
(Continued)

FOREIGN PATENT DOCUMENTS

CA 2674149 A1 7/2008
CN 102685491 A 9/2012
(Continued)

OTHER PUBLICATIONS

International Search Report dated Sep. 13, 2016, issued in corresponding International Patent Application No. PCT/JP2016/069021. (8 pages).
(Continued)

*Primary Examiner* — Clifford Hilaire
(74) *Attorney, Agent, or Firm* — Fitch, Even, Tabin & Flannery LLP

(57) ABSTRACT

A moving image encoding apparatus that encodes a moving image and generates encoded data includes an extraction unit configured to extract a brightness change direction for each of blocks acquired by dividing the moving image; and a pixel value control unit configured to control pixel values of a locally decoded image based on the brightness change direction extracted by the extraction unit, for each of the blocks acquired by dividing the moving image.

11 Claims, 11 Drawing Sheets

(51) Int. Cl.
  *H04N 19/117* (2014.01)
  *H04N 19/14* (2014.01)
  *H04N 19/176* (2014.01)
  *H04N 19/182* (2014.01)
  *H04N 19/159* (2014.01)
  *H04N 19/126* (2014.01)
  *H04N 19/119* (2014.01)
  *H04N 19/124* (2014.01)
  *H04N 19/147* (2014.01)

(52) U.S. Cl.
  CPC ......... *H04N 19/124* (2014.11); *H04N 19/126* (2014.11); *H04N 19/14* (2014.11); *H04N 19/147* (2014.11); *H04N 19/159* (2014.11); *H04N 19/176* (2014.11); *H04N 19/82* (2014.11); *H04N 19/86* (2014.11)

(56) References Cited

U.S. PATENT DOCUMENTS

| | | | |
|---|---|---|---|
| 5,701,366 | A | 12/1997 | Ostromoukhov et al. |
| 9,008,179 | B2 | 4/2015 | Gao et al. |
| 9,516,349 | B2 | 12/2016 | Gao et al. |
| 10,244,262 | B2 | 3/2019 | Gao et al. |
| 2007/0286515 | A1 | 12/2007 | Kim et al. |
| 2010/0246689 | A1 | 9/2010 | Filippini et al. |
| 2010/0316119 | A1* | 12/2010 | Mathew ............... G06K 9/3266 375/240.03 |
| 2011/0019931 | A1 | 1/2011 | Hamada et al. |
| 2013/0003838 | A1 | 1/2013 | Gao et al. |
| 2013/0003839 | A1 | 1/2013 | Gao et al. |
| 2013/0094779 | A1* | 4/2013 | Budagavi ................ G06T 5/002 382/260 |
| 2013/0329784 | A1* | 12/2013 | Chuang ................ H04N 19/102 375/240.02 |
| 2014/0185664 | A1* | 7/2014 | Van Der Auwera ... H04N 19/50 375/240.02 |
| 2015/0201213 | A1 | 7/2015 | Suzuki et al. |
| 2017/0180750 | A1 | 6/2017 | Suzuki et al. |
| 2017/0180751 | A1 | 6/2017 | Suzuki et al. |

FOREIGN PATENT DOCUMENTS

| | | |
|---|---|---|
| CN | 104041035 A | 9/2014 |
| JP | H4-259182 A | 9/1992 |
| JP | 2008-047102 A | 2/2008 |
| JP | 2009-055591 A | 3/2009 |
| JP | 2010-515361 A | 5/2010 |
| JP | 2011-029998 A | 2/2011 |
| JP | 2014-064249 A | 4/2014 |
| WO | 2010/047104 A1 | 4/2010 |
| WO | 2013-003805 A2 | 1/2013 |
| WO | 2013-003819 A1 | 1/2013 |
| WO | 2013-003823 A1 | 1/2013 |
| WO | 2013-009896 A1 | 1/2013 |

OTHER PUBLICATIONS

ITU-T H.265; Series H: Audiovisual and Multimedia Systems; Infrastructure of audiovisual services—Coding of moving video; "High efficiency video coding"; Apr. 2015 (634 pages).

Partial Supplementary European search report dated May 17, 2018 concerning the corresponding European Patent Application No. 16838907.0 (13 pages).

CNIPA; Application No. 201680047745.0; Office Action dated Oct. 9, 2019.

* cited by examiner

MOVING IMAGE ENCODING APPARATUS, MOVING IMAGE DECODING APPARATUS, MOVING IMAGE ENCODING METHOD, MOVING IMAGE DECODING METHOD, AND COMPUTER READABLE STORAGE MEDIUM

CROSS-REFERENCE TO RELATED APPLICATIONS

This application is a Continuation of International Patent Application No. PCT/JP2016/069021, filed Jun. 27, 2016, which claims the benefit of Japanese Patent Application No. 2015-166051, filed Aug. 25, 2015, both of which are hereby incorporated by reference herein in their entirety.

TECHNICAL FIELD

The present invention relates to a moving image encoding apparatus, a moving image decoding apparatus, a moving image encoding method, a moving image decoding method, and a computer readable storage medium.

BACKGROUND ART

In an uncompressed moving image, in a region in which the brightness changes subjectively smoothly, there are cases where the smoothness of the brightness is lost and a pseudo contour occurs due to encoding using a moving image coding system described in Non-patent Literature 1 such as HEVC. This pseudo contour is outstandingly perceived in a region in which changes in pixel values are small (the difference between the maximum pixel value and the minimum pixel value is about 1 to 16), and the brightness smoothly changes, for example, in a dawn scene and a night sky scene. In view of this, Patent Literatures 1 and 2 propose techniques for suppressing a pseudo contour.

In the technique described in Patent Literature 1, the signal of a reference pixel is gradually changed by performing filtering processing on the reference pixel, with focus on the fact that, when intra prediction is performed using a reference pixel that includes block noise, this block noise propagates to a prediction target block.

In the technique described in Patent Literature 2, after increasing the number of tones of an image and generating a high gradation image, the high gradation image is quantized such that a quantization error is modulated in a band in which sensitivity is relatively low according to human visual sense characteristics, and the number of tones is reduced.

CITATION LIST

Non-Patent Literature

NON-PATENT LITERATURE 1: ITU-T H.265 HIGH EFFICIENCY VIDEO CODING

Patent Literature

PTL1: Japanese Patent Laid-Open No. 2014-064249
PTL2: Japanese Patent Laid-Open No. 2011-029998

SUMMARY OF INVENTION

Technical Problem

However, in the technique described in Patent Literature 1, the target of the above-described filtering processing is reference pixels whose pixel values change in a large amount to an extent to which block noise occurs. Therefore, filtering processing is not performed on reference pixels whose pixel values do not change to the extent to which block noise occurs, and thus there have been cases where the above-described pseudo contour cannot be suppressed.

On the other hand, in the technique described in Patent Literature 2, it is necessary to perform processing for increasing the number of tones of an image in order to generate a high gradation image. Therefore, there has been a risk that the calculation cost increases.

Solution to Problem

According to one aspect of the present invention, a moving image encoding apparatus that encodes a moving image and generates encoded data includes an extraction unit configured to extract a brightness change direction for each of blocks acquired by dividing the moving image; and a pixel value control unit configured to control pixel values of a locally decoded image based on the brightness change direction extracted by the extraction unit, for each of the blocks acquired by dividing the moving image.

Other features and advantages of the present invention will be apparent from description given below with reference to the accompanying drawings. Note that, in the attached drawings, the same reference numerals are given to the same or similar configurations.

DESCRIPTION OF EMBODIMENTS

Embodiments of the present invention will be described below with reference to the drawings. Note that constituent elements in the following embodiments can be replaced by existing constituent elements or the like as appropriate, and various variations including combination with other existing constituent elements are possible. Therefore, description in the following embodiments does not limit the content of the invention described in the scope of the claims.

First Embodiment

Figure 1:
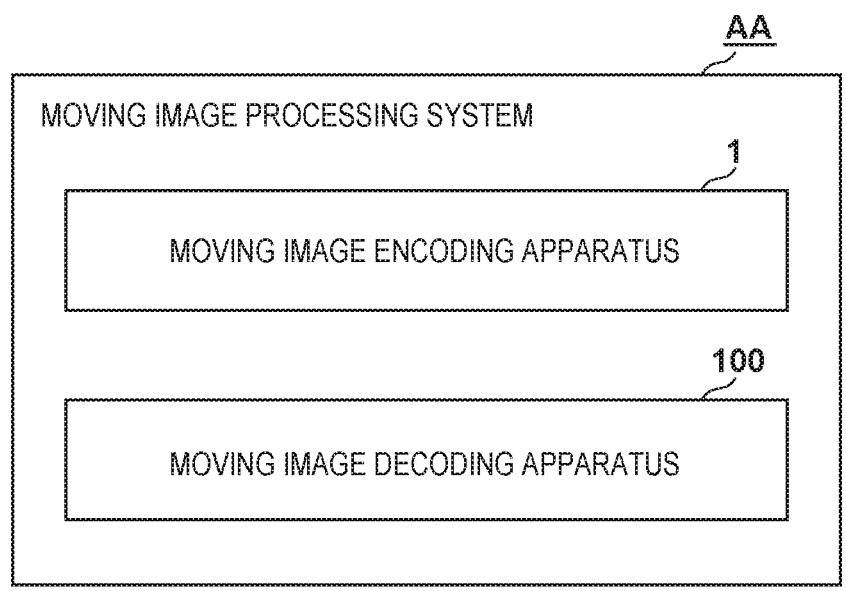
FIG. 1 is a block diagram of a moving image processing system according to an embodiment.

FIG. 1 is a block diagram of a moving image processing system AA according to this embodiment. The moving image processing system AA includes a moving image encoding apparatus 1 that encodes a moving image and generates a bit stream, and a moving image decoding apparatus 100 that decodes the bit stream generated by the moving image encoding apparatus 1. The moving image encoding apparatus 1 and the moving image decoding apparatus 100 transmit/receive the above-described bit stream via a transmission path, for example.

Figure 2:
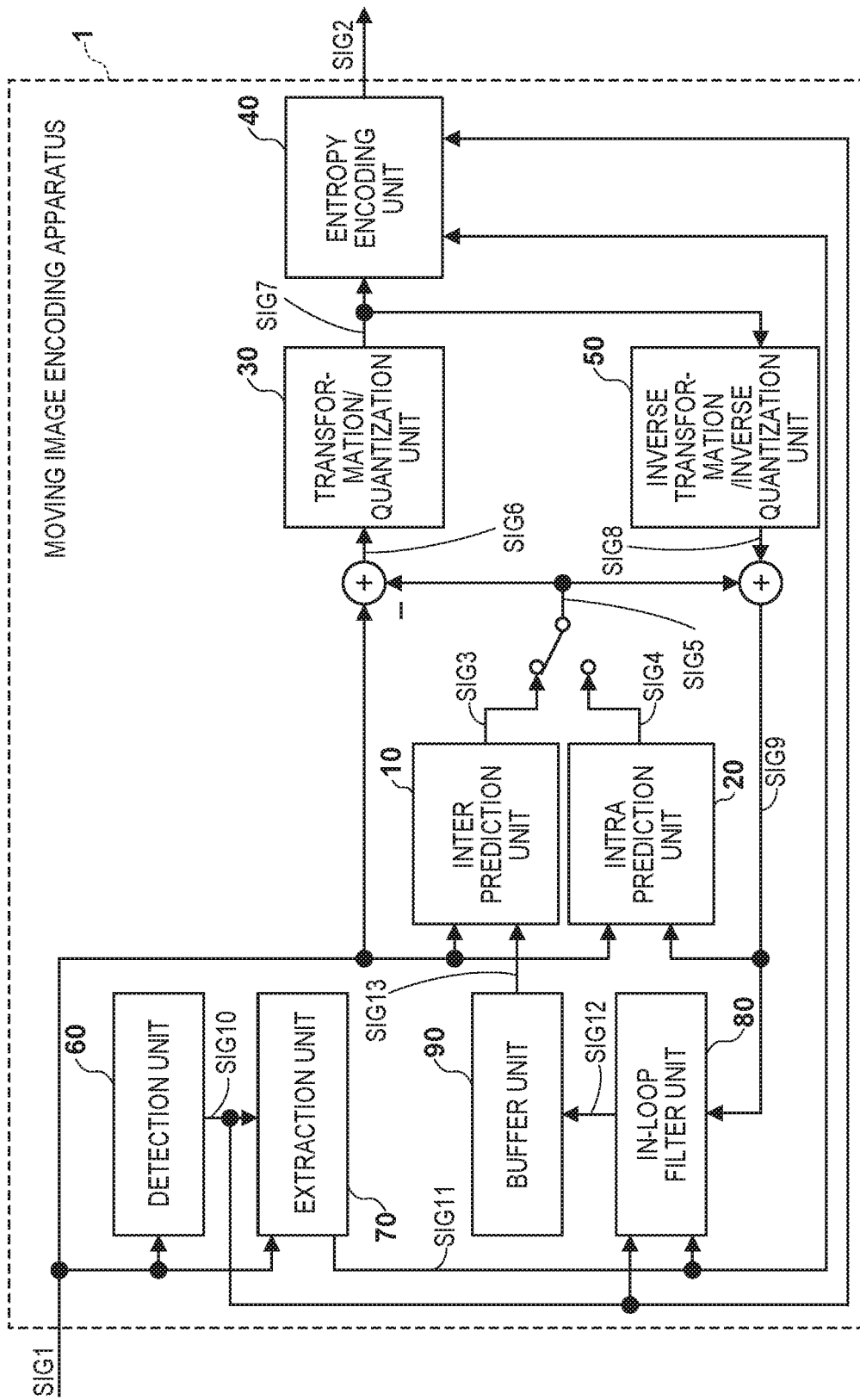
FIG. 2 is a block diagram of a moving image encoding apparatus according to an embodiment.

FIG. 2 is a block diagram of the moving image encoding apparatus 1. An input image SIG1 and a filtered and locally decoded image SIG13 that is supplied from a buffer unit 90 and will be described later are input to an inter prediction unit 10. This inter prediction unit 10 performs inter prediction using the input image SIG1 and the filtered and locally decoded image SIG13, and generates and outputs an inter prediction signal SIG3.

The input image SIG1 and a locally decoded image SIG9 before being filtered that is to be described later are input to an intra prediction unit 20. This intra prediction unit 20 performs intra prediction using the input image SIG1 and the locally decoded image SIG9 before being filtered, and generates and outputs an intra prediction image SIG4.

An error (residual) signal SIG6 is input to a transformation/quantization unit 30. The residual signal SIG6 is a difference signal between the input image SIG1 and a prediction image SIG5, and the prediction image SIG5 is a prediction image calculated from the inter prediction signal SIG3 and the intra prediction image SIG4 using a prediction method by which the highest encoding performance is expected. The transformation/quantization unit 30 performs orthogonal transformation processing on the residual signal SIG6 that has been input, and performs quantization processing on a transformation coefficient obtained by performing this orthogonal transformation processing, and outputs the result as a quantized level value SIG7.

The quantized level value SIG7, a detection result SIG10 to be described later, and an extraction result SIG11 to be described later are input to an entropy encoding unit 40. This entropy encoding unit 40 performs entropy encoding on a signal that has been input, and outputs the signal as a bit stream SIG2.

The quantized level value SIG7 is input to an inverse transformation/inverse quantization unit 50. This inverse transformation/inverse quantization unit 50 performs inverse quantization processing on the quantized level value SIG7, and performs inverse orthogonal transformation processing on a transformation coefficient acquired by performing this inverse quantization processing, and outputs the result as a residual signal SIG8 that went under inverse orthogonal transformation.

The input image SIG1 is input to a detection unit 60. The input image SIG1 is divided into a plurality of blocks in advance, and the detection unit 60 detects, as a target block, a block in which change in pixel values is small, and the brightness smoothly change, in the input image SIG1, and outputs the block as the detection result SIG10.

Specifically, first, the detection unit 60 obtains an intra-block change value and an edge value for each block.

In the case of obtaining an intra-block change value in a prediction target block, the detection unit 60 first obtains the pixel values of the pixels of the prediction target block based on the input image SIG1. Next, the difference between the largest pixel value of the obtained pixel values and the smallest pixel value of the obtained pixel values is calculated, and is set as an intra-block change value in the prediction target block.

In addition, in the case of obtaining an edge value in a prediction target block, the detection unit 60 first obtains combination of pixels adjacent to each other from the pixels of the prediction target block, based on the input image SIG1. Next, the difference between the pixel values of pixels in each combination is calculated, and the total of calculated pixel value differences is calculated, and is set as an edge value of the prediction target block.

Next, the detection unit 60 detects, as the above-described target block, blocks whose block size is larger than or equal to a predetermined value, for example, 32×32, whose intra-block change value is larger than or equal to 1 and smaller than α, and whose edge value is larger than or equal to β. Note that α above is defined by Expression 1 below, and β above is defined by Expression 2 below.

$$\alpha = 7 + \frac{\text{edge value} \times 2}{(\text{block size})^2} \qquad [\text{Expression 1}]$$

$$\beta = \frac{(\text{block size})^2}{2} \qquad [\text{Expression 2}]$$

The input image SIG1 and the detection result SIG10 are input to an extraction unit 70. This extraction unit 70 extracts a brightness change direction for each of the target blocks detected by the detection unit 60, and outputs the brightness change direction as the extraction result SIG11.

Specifically, first, the extraction unit 70 acquires the pixel values of the pixels of a target block based on the input image SIG1 and the detection result SIG10.

Next, the extraction unit 70 assumes a three-dimensional space, sets an X axis direction of the three-dimensional space as the horizontal direction of the target block, a Y axis direction of the three-dimensional space as the vertical direction of the target block, and a Z axis direction of the three-dimensional space as the pixel values of the pixels of the target block, and obtains a flat surface approximated to the pixel values of these pixels. Note that the above-described flat surface can be obtained using the least square method, for example.

Next, the extraction unit 70 extracts the above-described brightness change direction from the inclination of the obtained flat surface.

The locally decoded image SIG9 before being filtered, the detection result SIG10, and the extraction result SIG11 are input to an in-loop filter unit 80. The locally decoded image SIG9 before being filtered is signals obtained by adding the prediction image SIG5 and the residual signal SIG8 that went under inverse orthogonal transformation. The in-loop filter unit 80 performs filtering processing on the locally decoded image SIG9 before being filtered based on the detection result SIG10 and the extraction result SIG11, and generates and outputs a filtered and locally decoded image SIG12.

Specifically, first, the in-loop filter unit 80 determines whether or not the prediction target block is a target block, based on the detection result SIG10.

Next, regarding a prediction target block determined to be not a target block, the in-loop filter unit 80 applies an in-loop filter such as a deblock filter to the locally decoded image SIG9 before being filtered, and output the result as the filtered and locally decoded image SIG12.

On the other hand, regarding a prediction target block determined to be a target block, the locally decoded image SIG9 before being filtered is processed such that the change in brightness is regenerated using distribution of pixel value change, and after that, similar to the case where the prediction target block is not a target block, an in-loop filter is applied to the locally decoded image SIG9 before being filtered that went under this processing, and the result is output as the filtered and locally decoded image SIG12.

Here, in the processing that is performed on the locally decoded image SIG9 before being filtered such that the change in brightness is regenerated using distribution of pixel value change, a random number on which the brightness change direction is reflected is added to the pixel values of the pixels of the target block of the locally decoded image SIG9 before being filtered. An example of this processing will be described below. The in-loop filter unit 80 first generates a random number that is larger than or equal to 0 and smaller than 1 for each of the pixels of the target block. Next, a coefficient that increases as the brightness increases along the brightness change direction is set for each of the pixels of the target block. Next, for each of the pixels of the target block, the generated random number is multiplied by the coefficient that has been set. Next, the multiplication result is added to the pixel value of each of the pixels of the target block.

Filtered and locally decoded images SIG12 are accumulated in the buffer unit 90, and are supplied as filtered and locally decoded images SIG13 to the inter prediction unit 10 as appropriate.

Figure 3:
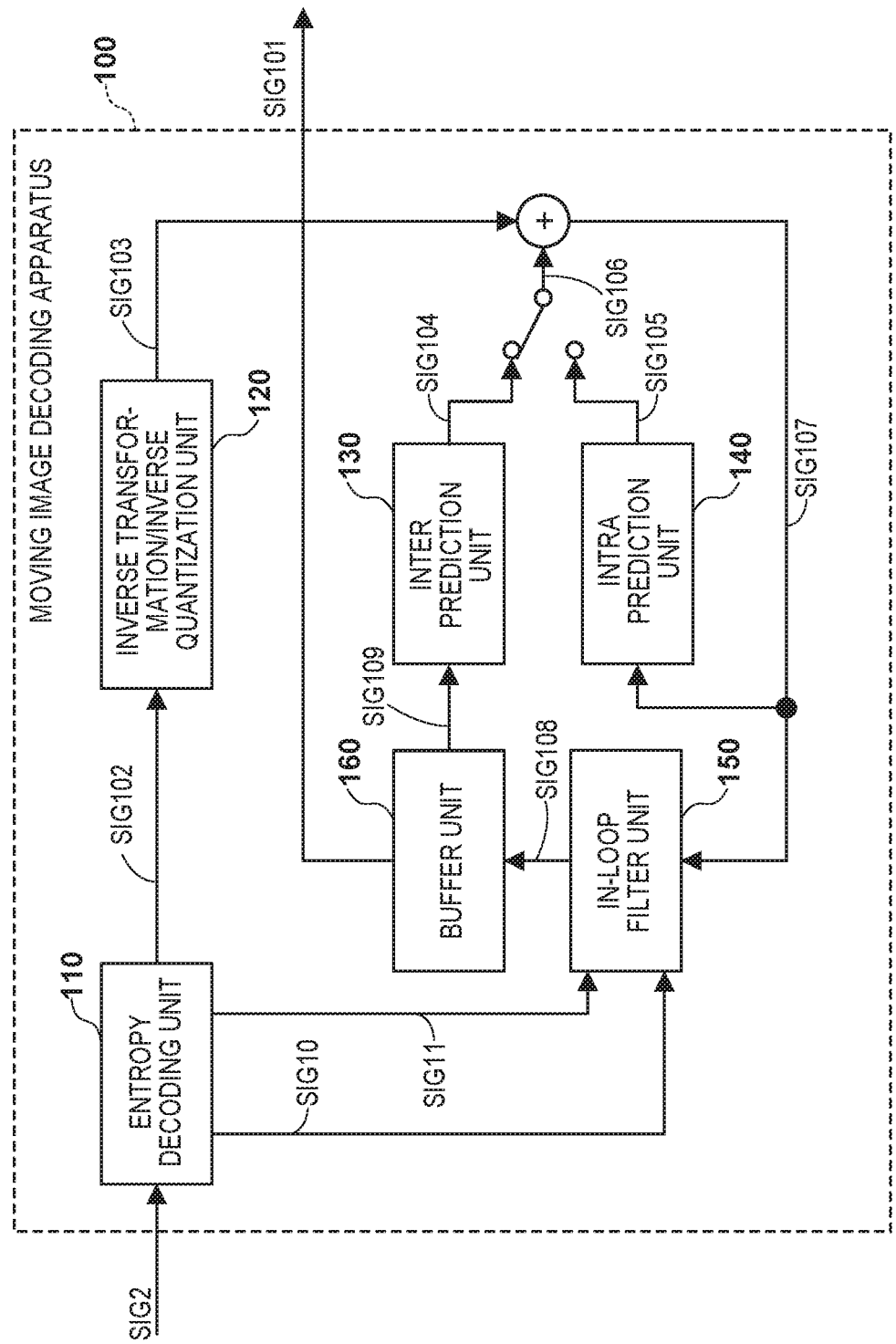
FIG. 3 is a block diagram of a moving image decoding apparatus according to an embodiment.

FIG. 3 is a block diagram of the moving image decoding apparatus 100. The bit stream SIG2 is input to an entropy decoding unit 110. This entropy decoding unit 110 performs entropy decoding on the bit stream SIG2, and derives and outputs a quantization coefficient level SIG102, the detection result SIG10 generated by the moving image encoding apparatus 1, and the extraction result SIG11 generated by the moving image encoding apparatus 1.

The quantization coefficient level SIG102 is input to an inverse transformation/inverse quantization unit 120. This inverse transformation/inverse quantization unit 120 performs inverse quantization processing on the quantization coefficient level SIG102, and performs inverse orthogonal transformation processing on the result of this inverse quantization processing, and outputs the result of the inverse orthogonal transformation processing as a residual signal SIG103.

A filtered and locally decoded image SIG109 that is supplied from a buffer unit 160, and will be described later is input to an inter prediction unit 130. This inter prediction unit 130 performs inter prediction using the filtered and locally decoded image SIG109, and generates and outputs an inter prediction image SIG104.

A locally decoded image SIG107 before being filtered is input to an intra prediction unit 140. The locally decoded image SIG107 before being filtered is signals obtained by adding residual signals SIG103 and a prediction image SIG106, and the prediction image SIG106 is a prediction image calculated from the inter prediction image SIG104 and an intra prediction image SIG105 using a prediction method by which the highest encoding performance is expected. The intra prediction unit 140 performs intra prediction using the locally decoded image SIG107 before being filtered, and generates and outputs the intra prediction image SIG105.

The detection result SIG10, the extraction result SIG11, and the locally decoded image SIG107 before being filtered are input to an in-loop filter unit 150. This in-loop filter unit 150 performs filtering processing on the locally decoded image SIG107 before being filtered, based on the detection result SIG10 and the extraction result SIG11, similar to the in-loop filter unit 80 provided in the moving image encoding apparatus 1, and generates and outputs a filtered and locally decoded image SIG108.

Specifically, first, the in-loop filter unit 150 determines whether or not a prediction target block is a target block, based on the detection result SIG10.

Next, regarding a prediction target block determined to be not a target block, the in-loop filter unit 150 applies an in-loop filter such as a deblock filter to the locally decoded image SIG107 before being filtered, and outputs the result as the filtered and locally decoded image SIG108.

On the other hand, regarding a prediction target block determined to be a target block, the locally decoded image SIG107 before being filtered is processed such that the change in brightness is regenerated using distribution of pixel value change, and after that, an in-loop filter is then applied to the locally decoded image SIG107 before being filtered that went under this processing, similar to the case where the prediction target block is not a target block, and the result is output as the filtered and locally decoded image SIG108.

Here, in the processing that is performed on the locally decoded image SIG107 before being filtered such that the change in brightness is regenerated using distribution of pixel value change, a random number on which the brightness change direction is reflected is added to the pixel value of each of the pixels of the target block of the locally decoded image SIG107 before being filtered. An example of this processing will be described below. First, the in-loop filter unit 150 generates a random number that is larger than or equal to 0 and smaller than or equal to 1 for each of the pixels of the target block. Next, one coefficient that increases as the brightness increases along the brightness change direction is set for each of the pixels of the target block. Next, for each of the pixels of the target block, the generated random number is multiplied by the coefficient that has been set. Next, the multiplication result is added to the pixel value of each of the pixels of the target block.

Filtered and locally decoded images SIG108 are accumulated in the buffer unit 160, are supplied as filtered and locally decoded images SIG109 to the inter prediction unit 130 as appropriate, and are output as decoded images SIG101.

According to the above-described moving image encoding apparatus 1, the following effects can be exerted.

The moving image encoding apparatus 1 causes the extraction unit 70 to extract a brightness change direction for each target block detected by the detection unit 60, and causes the in-loop filter unit 80 to control the pixel values of the locally decoded image SIG9 before being filtered, based on the brightness change direction extracted by the extraction unit 70. Therefore, even in a case where change in pixel values of the locally decoded image SIG9 before being filtered is small to a degree to which a pseudo contour cannot be suppressed by the technique described in Patent Literature 1 above, a pseudo contour can be suppressed by controlling the pixel values of the locally decoded image SIG9 before being filtered, based on the brightness change direction.

In addition, as described above, the moving image encoding apparatus 1 causes the extraction unit 70 to extract a brightness change direction for each target block detected by the detection unit 60, and causes the in-loop filter unit 80 to control the pixel values of the locally decoded image SIG9 before being filtered, based on the brightness change direction extracted by the extraction unit 70. Therefore, it is not necessary to generate a high gradation image as the technique described in Patent Literature 2 above, and thus the increase in calculation cost can be suppressed.

In addition, the moving image encoding apparatus 1 causes the in-loop filter unit 80 to add a random number on which the brightness change direction extracted by the extraction unit 70 is reflected, to the pixel values of the locally decoded image SIG9 before being filtered. Therefore, in the vicinity of the contour line of a pseudo contour desired to be suppressed, it is possible to ensure that pixel values do not regularly change along this contour line, taking the brightness change direction into consideration, and thus a pseudo contour can be suppressed accurately.

In addition, the moving image encoding apparatus 1 causes the detection unit 60 to detect, as the above-described target block, a block whose block size is 32×32 or more, whose intra-block change value is larger than or equal to 1 and smaller than $\alpha$, and whose edge value is larger than or equal to $\beta$. In addition, for each of blocks detected as target block by the detection unit 60, a brightness change direction is extracted by the extraction unit 70, and the pixel values of the locally decoded image SIG9 before being filtered are controlled by the in-loop filter unit 80 based on the brightness change direction. Therefore, a block in which change in pixel values is small, and the brightness smoothly changes is detected by the detection unit 60, and this block can be processed by the extraction unit 70, and can be processed based on the brightness change direction by the in-loop filter unit 80. Therefore, regarding a block in which change in pixel values is large and a block in which brightness does not smoothly change, in other words, a block in which a pseudo contour is unlikely to occur, the processing that is performed by the extraction unit 70 and the processing that is performed based on the brightness change direction by the in-loop filter unit 80 are reduced such that the calculation cost can be suppressed.

According to the above-described moving image decoding apparatus 100, the following effects can be exerted.

The moving image decoding apparatus 100 causes the entropy decoding unit 110 to perform entropy decoding on the bit stream SIG2 and acquire a brightness change direction extracted for each block, and, for each block, causes the in-loop filter unit 150 to control the pixel values of the locally decoded image SIG107 before being filtered, based on the brightness change direction acquired by the entropy decoding unit 110. Therefore, even in a case where change in pixel values of the locally decoded image SIG107 before being filtered is small to an extent to which a pseudo contour cannot be suppressed by the technique described in Patent Literature 1 above, a pseudo contour can be suppressed by controlling the pixel values of the locally decoded image SIG107 before being filtered, based on the brightness change direction.

In addition, as described above, the moving image decoding apparatus 100 causes the entropy decoding unit 110 to perform entropy decoding on the bit stream SIG2 and acquire a brightness change direction extracted for each block, and, for each block, causes the in-loop filter unit 150 to control the pixel values of the locally decoded image SIG107 before being filtered, based on the brightness change direction acquired by the entropy decoding unit 110. Therefore, it is not necessary to generate a high gradation image as the technique described in Patent Literature 2 above, and thus the increase in calculation cost can be suppressed.

In addition, the moving image decoding apparatus 100 causes the in-loop filter unit 150 to add a random number on which the brightness change direction acquired by the entropy decoding unit 110 is reflected, to the pixel values of the locally decoded image SIG107 before being filtered. Therefore, in the vicinity of the contour line of a pseudo contour desired to be suppressed, it is possible to ensure that pixel values do not regularly change along this contour line taking the brightness change direction into consideration, and thus a pseudo contour can be suppressed accurately.

Second Embodiment

Figure 4:
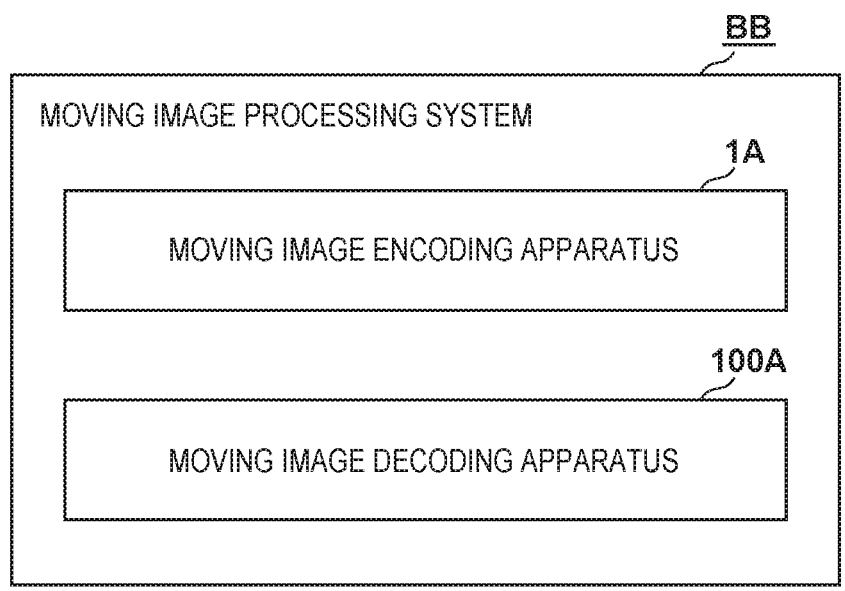
FIG. 4 is a block diagram of a moving image processing system according to an embodiment.

FIG. 4 is a block diagram of a moving image processing system BB according to this embodiment. The moving image processing system BB is different from the moving image processing system AA according to the first embodiment of the present invention shown in FIG. 1 in that the moving image processing system BB includes a moving image encoding apparatus 1A in place of the moving image encoding apparatus 1, and a moving image decoding apparatus 100A in place of the moving image decoding apparatus 100.

Figure 5:
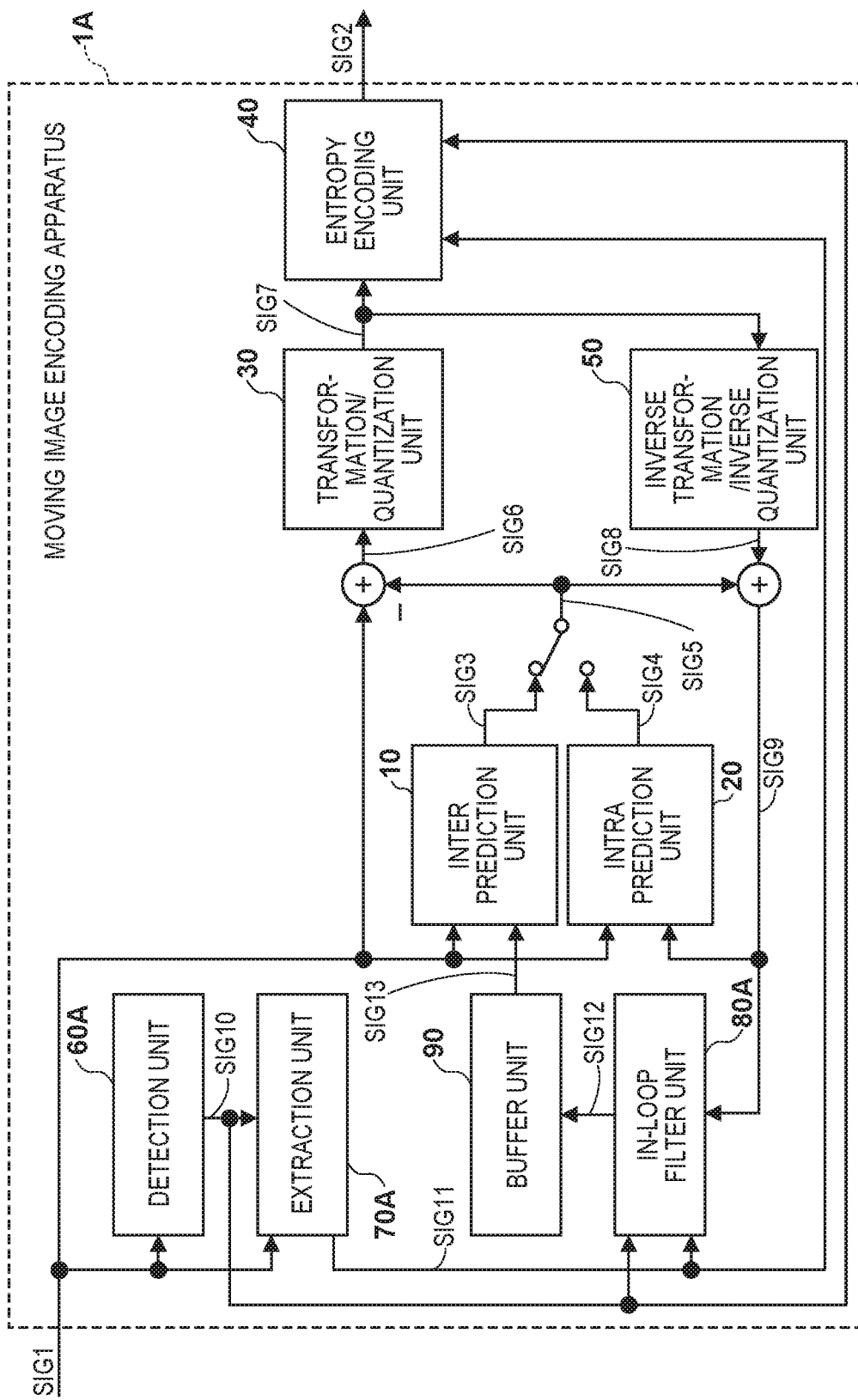
FIG. 5 is a block diagram of a moving image encoding apparatus according to an embodiment.

FIG. 5 is a block diagram of the moving image encoding apparatus 1A. The moving image encoding apparatus 1A is different from the moving image encoding apparatus 1 according to the first embodiment shown in FIG. 2 in that the moving image encoding apparatus 1A includes a detection unit 60A in place of the detection unit 60, an extraction unit 70A in place of the extraction unit 70, and an in-loop filter unit 80A in place of the in-loop filter unit 80. Note that, in the moving image encoding apparatus 1A, the same reference numerals are given to the same configuration elements as the moving image encoding apparatus 1, and a description thereof is omitted.

An input image SIG1 is input to the detection unit 60A. Similar to the detection unit 60, this detection unit 60A detects, as a target block, a block in which change in pixel values is small, and the brightness smoothly changes, in the input image SIG1, and outputs the detected target block as a detection result SIG10. Note that the detection unit 60A performs the above-described detection only on a block to which intra prediction or bidirectional prediction was applied when calculating a prediction image SIG5.

The input image SIG1 and the detection result SIG10 are input to the extraction unit 70A. Similar to the extraction unit 70, this extraction unit 70A extracts a brightness change direction regarding the target block detected by the detection unit 60A, and outputs the brightness change direction as an extraction result SIG11. Note that the extraction unit 70A performs the above-described extraction only on a block to which intra prediction or bidirectional prediction was applied when calculating the prediction image SIG5 and that was detected as a target block by the detection unit 60A.

A locally decoded image SIG9 before being filtered, the detection result SIG10, and the extraction result SIG11 are input to the in-loop filter unit 80A. Similar to the in-loop filter unit 80, this in-loop filter unit 80A performs filtering processing on the locally decoded image SIG9 before being filtered, based on the detection result SIG10 and the extraction result SIG11, and generates and outputs a filtered and locally decoded image SIG12. Note that the in-loop filter unit 80A performs processing on a block to which neither intra prediction nor bidirectional prediction was applied when calculating the prediction image SIG5, the processing being similar to that in the case where the block is not a target block, even if the block is a target block.

Figure 6:
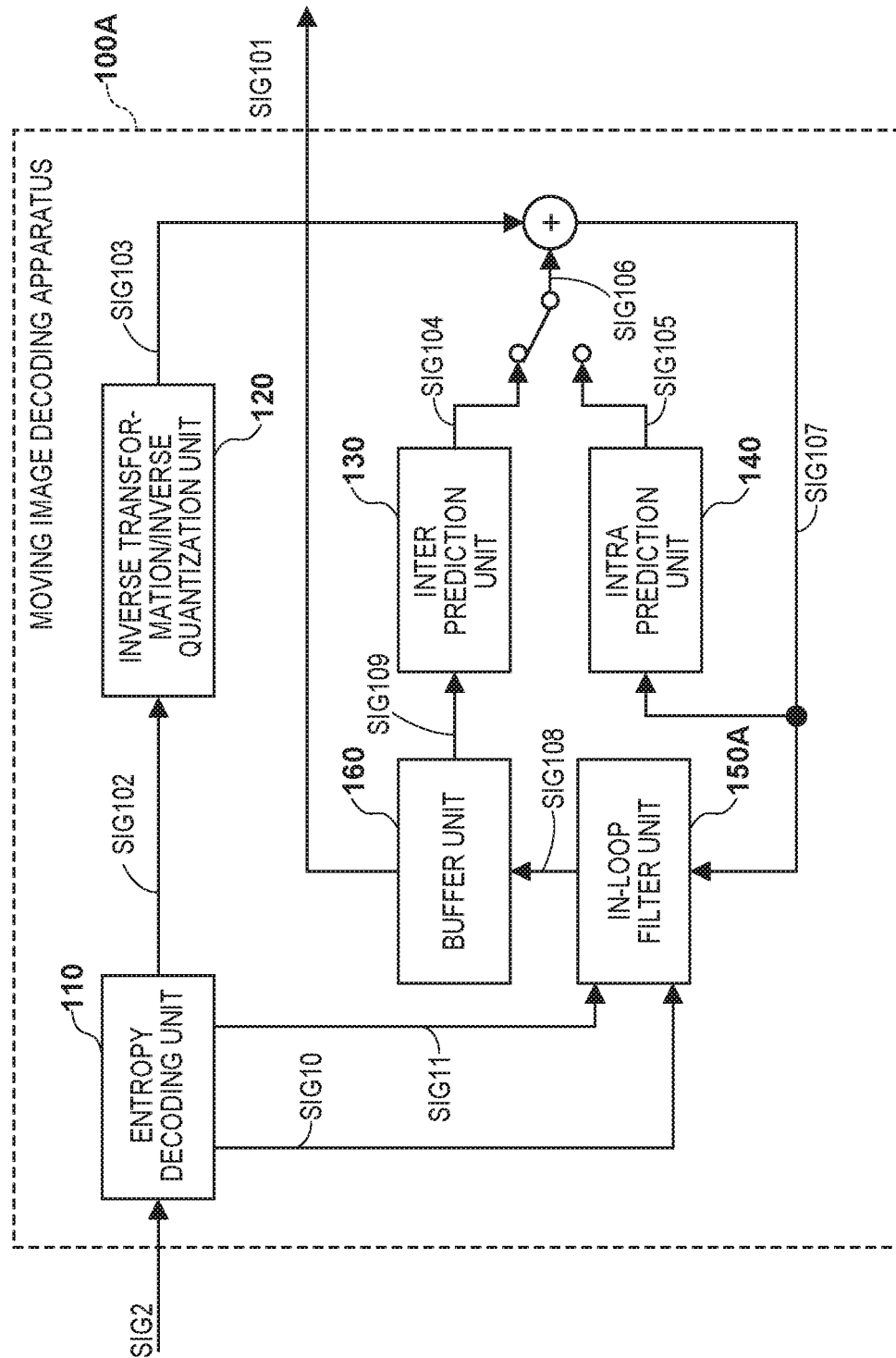
FIG. 6 is a block diagram of a moving image decoding apparatus according to an embodiment.

FIG. 6 is a block diagram of the moving image decoding apparatus 100A. The moving image decoding apparatus 100A is different from the moving image decoding apparatus 100 according to the first embodiment of the present invention shown in FIG. 3 in that the moving image decoding apparatus 100A includes an in-loop filter unit 150A in place of the in-loop filter unit 150. Note that, in the moving image decoding apparatus 100A, the same reference numerals are given to the same configuration elements as the moving image decoding apparatus 100, and a description thereof is omitted.

The detection result SIG10, the extraction result SIG11, and a locally decoded image SIG107 before being filtered are input to the in-loop filter unit 150A. Similar to the in-loop filter unit 150, this in-loop filter unit 150A performs filtering processing on the locally decoded image SIG107 before being filtered, based on the detection result SIG10 and the extraction result SIG11, and generates and outputs a filtered and locally decoded image SIG108. Note that the in-loop filter unit 150A performs processing on a block to which neither intra prediction nor bidirectional prediction was applied when calculating a prediction image SIG106, the processing being similar to that in the case where the block is not a target block, even if the block is a target block.

According to the above-described moving image encoding apparatus 1A, the following effect can be exerted in addition to the above-described effects that can be exerted by the moving image encoding apparatus 1.

The moving image encoding apparatus 1A causes the detection unit 60A to detect a target block, regarding each block to which intra prediction or bidirectional prediction was applied. In addition, for each block to which intra prediction or bidirectional prediction was applied, and that was detected as a target block by the detection unit 60A, the extraction unit 70A extracts a brightness change direction, and the in-loop filter unit 80A controls the pixel values of the locally decoded image SIG9 before being filtered, based on the brightness change direction. Therefore, regarding a block to which unidirectional prediction was applied, a block in which change in pixel values is large, and a block in which the brightness does not smoothly change, the processing performed by the extraction unit 70A, and the processing performed based on the brightness change direction by the in-loop filter unit 80A are reduced such that the calculation cost can be suppressed.

According to the above-described moving image decoding apparatus 100A, the following effect can be exerted in addition to the above-described effects that the moving image decoding apparatus 100 can exert.

For each block to which intra prediction or bidirectional prediction was applied, the moving image decoding apparatus 100A causes the in-loop filter unit 150A to control the pixel values of the locally decoded image SIG107 before being filtered, based on the brightness change direction. Therefore, in a block to which unidirectional prediction was applied, in other words, a block in which a pseudo contour is unlikely to occur, the processing that is performed based on the brightness change direction by the in-loop filter unit 150A is reduced, such that the calculation cost can be suppressed.

Third Embodiment

Figure 7:
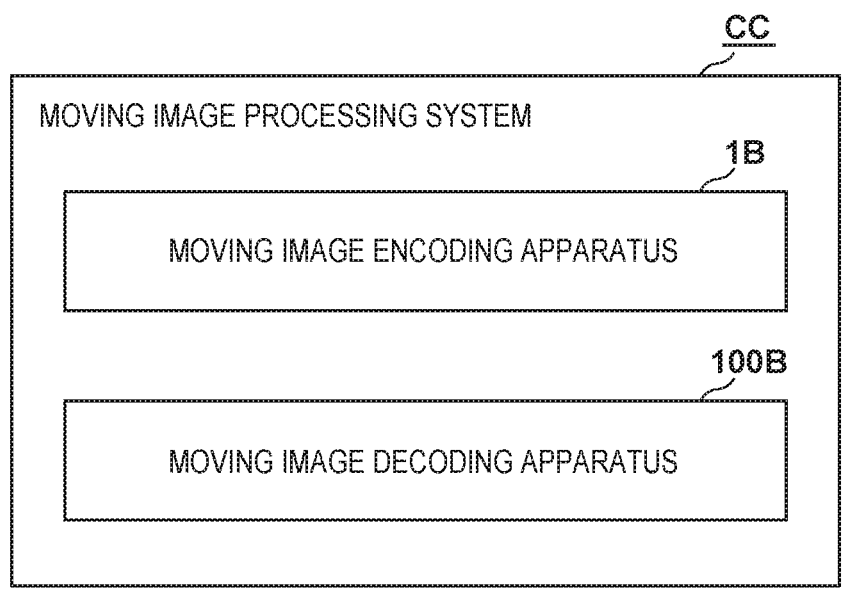
FIG. 7 is a block diagram of a moving image processing system according to an embodiment.

FIG. 7 is a block diagram of a moving image processing system CC according to this embodiment. The moving image processing system CC is different from the moving image processing system AA according to the first embodiment of the present invention shown in FIG. 1 in that the moving image processing system CC includes a moving image encoding apparatus 1B in place of the moving image encoding apparatus 1, and a moving image decoding apparatus 100B in place of the moving image decoding apparatus 100.

Figure 8:
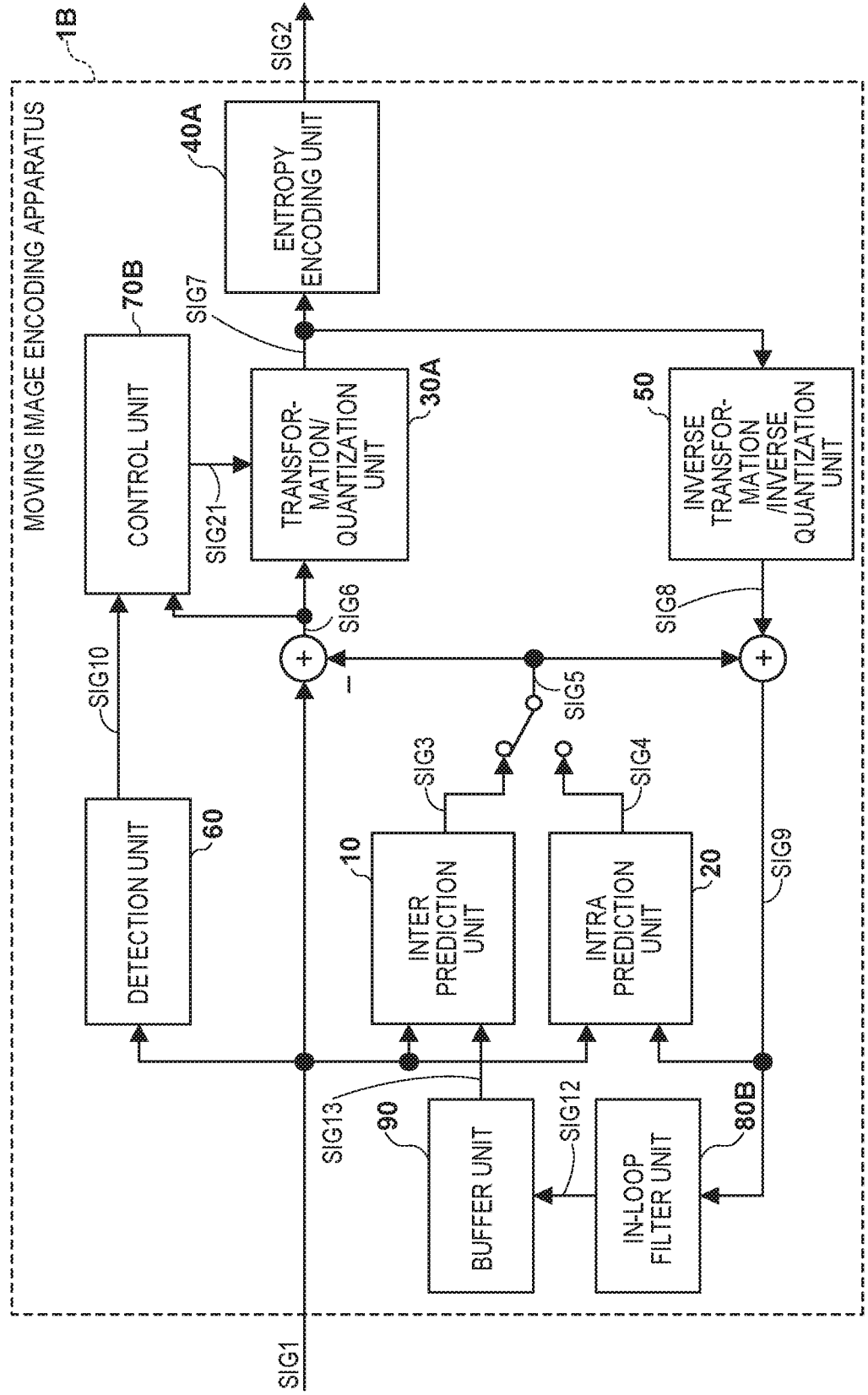
FIG. 8 is a block diagram of a moving image encoding apparatus according to an embodiment.

FIG. 8 is a block diagram of the moving image encoding apparatus 1B. The moving image encoding apparatus 1B is different from the moving image encoding apparatus 1 according to the first embodiment shown in FIG. 2 in that the moving image encoding apparatus 1B includes a transformation/quantization unit 30A in place of the transformation/quantization unit 30, an entropy encoding unit 40A in place of the entropy encoding unit 40, a control unit 70B in place of the extraction unit 70, and an in-loop filter unit 80B in place of the in-loop filter unit 80. Note that, in the moving image encoding apparatus 1B, the same reference numerals are given to the same configuration elements as the moving image encoding apparatus 1, and a description thereof is omitted.

A detection result SIG10 and a residual signal SIG6 are input to the control unit 70B. This control unit 70B as appropriate controls the residual signal SIG6 for each target block detected by a detection unit 60, and outputs the residual signal SIG6 as a control result SIG21 as appropriate. Specifically, the control unit 70B as appropriate controls the residual signal SIG6 such that the result of the transformation/quantization unit 30A performing orthogonal transformation processing and quantization processing on the residual signal SIG6 is a significant value of "1" or more.

More specifically, the control unit 70B determines whether or not the block is a target block, based on the detection result SIG10. If it is determined that the block is not a target block, the control unit 70B does not perform processing. Therefore, if the block is not a target block, the control result SIG21 is not output. On the other hand, if it is determined that the block is a target block, the control unit 70B performs the following processing, and outputs the control result SIG21.

First, regarding a target block, the control unit 70B performs orthogonal transformation processing on the residual signal SIG6 similar to the transformation/quantization unit 30A, and determines a level position at which the result of the transformation/quantization unit 30A performing orthogonal transformation processing and quantization processing is a significant value of "1" or more, regarding the residual signal SIG6 after quantization that is 0 if a conventional quantization algorithm is used. Specifically, first, the control unit 70B performs orthogonal transformation processing on the residual signal SIG6 similar to the transformation/quantization unit 30A so as to acquire a transformation coefficient, and scans the acquired transformation coefficient from a high-frequency component side. Next, out from the position of high-frequency component to a position at which the transformation coefficient exceeded 0.75 for the first time, a position at which the transformation coefficient is 0.25 or more is determined as a target for controlling the residual signal SIG6.

Next, the control unit 70B controls, regarding the target block, the residual signal SIG6 based on the determined level position, and the result is regarded as the control result SIG21. Specifically, the control unit 70B controls the residual signal SIG6 such that the result of the transformation/quantization unit 30A performing orthogonal transformation processing and quantization processing on the residual signal SIG6 is a significant value of "1" or more, regarding the position in the target block determined as a target to be controlled.

The residual signal SIG6 and the control result SIG21 are input to the transformation/quantization unit 30A. In the case where the control result SIG21 has not been input from the control unit 70B, this transformation/quantization unit 30A performs orthogonal transformation processing and quantization processing on the residual signal SIG6, similar to the transformation/quantization unit 30, and outputs the result as a quantized level value SIG7. On the other hand, in the case where the control result SIG21 has been input from the control unit 70B, the transformation/quantization unit 30A performs orthogonal transformation processing and quantization processing on the control result SIG21 similar to the transformation/quantization unit 30, and outputs the result as the quantized level value SIG7.

The quantized level value SIG7 is input to the entropy encoding unit 40A. This entropy encoding unit 40 performs entropy encoding on a signal that has been input, and outputs the result as a bit stream SIG2.

A locally decoded image SIG9 before being filtered is input to the in-loop filter unit 80B. This in-loop filter unit 80B applies an in-loop filter such as a deblock filter to the locally decoded image SIG9 before being filtered, and outputs the result as a filtered and locally decoded image SIG12.

Figure 9:
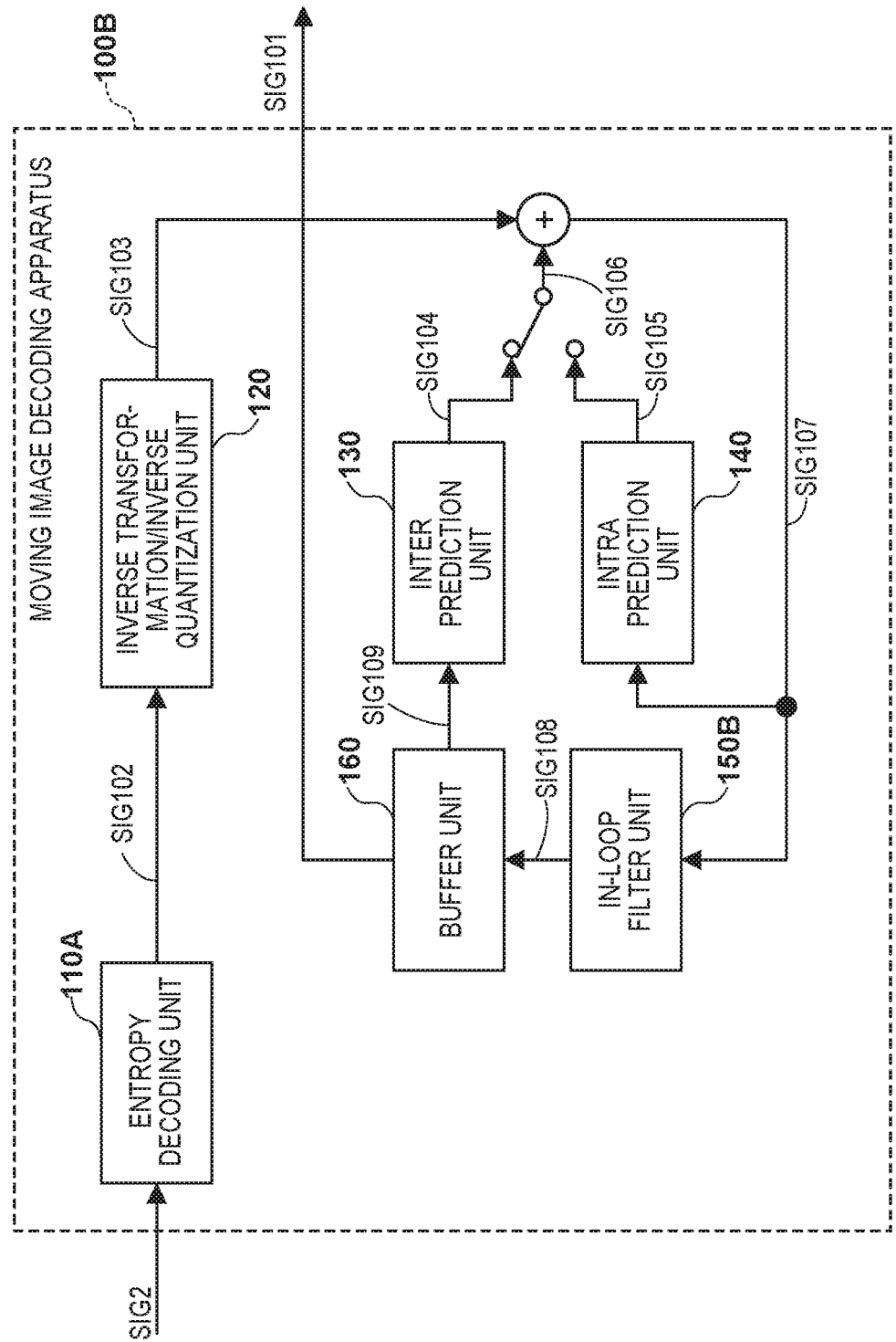
FIG. 9 is a block diagram of a moving image decoding apparatus according to an embodiment.

FIG. 9 is a block diagram of the moving image decoding apparatus 100B. The moving image decoding apparatus 100B is different from the moving image decoding apparatus 100 according to the first embodiment shown in FIG. 3 in that the moving image decoding apparatus 100B includes an entropy decoding unit 110A in place of the entropy decoding unit 110, and an in-loop filter unit 150B in place of the in-loop filter unit 150. Note that, in the moving image decoding apparatus 100B, the same reference numerals are given to the same configuration elements as the moving image decoding apparatus 100, and a description thereof is omitted.

The bit stream SIG2 is input to the entropy decoding unit 110A. This entropy decoding unit 110A performs entropy decoding on the bit stream SIG2, and derives and outputs a quantization coefficient level SIG102.

A locally decoded image SIG107 before being filtered is input to the in-loop filter unit 150B. This in-loop filter unit 150B applies an in-loop filter such as a deblock filter to the locally decoded image SIG107 before being filtered, and outputs the result as a filtered and locally decoded image SIG108.

According to the above-described moving image encoding apparatus 1B, the following effects can be exerted.

Before the transformation/quantization unit 30A performs orthogonal transformation processing and quantization processing, the moving image encoding apparatus 1B causes the in-loop filter unit 80B to control the residual signal SIG6 for each target block detected by the detection unit 60, such that the residual signal SIG6 after quantization that is 0 if a conventional quantization algorithm is used takes a significant value of "1" or more after the transformation/quantization unit 30A performs orthogonal transformation processing and quantization processing. Therefore, even a smaller change in gradation than the quantization width of the transformation/quantization unit 30A can take a significant value of "1" or more after orthogonal transformation processing and quantization processing, and thus a pseudo contour can be suppressed.

In addition, as described above, before the transformation/quantization unit 30A performs orthogonal transformation processing and quantization processing, the moving image encoding apparatus 1B causes the in-loop filter unit 80B to control the residual signal SIG6 for each target block detected by the detection unit 60, such that the residual signal SIG6 after quantization that is 0 if a conventional quantization algorithm is used takes a significant value of "1" or more after the transformation/quantization unit 30A performs orthogonal transformation processing and quantization processing. Therefore, even in the case where change in pixel values of the locally decoded image SIG9 before being filtered is small to an extent to which a pseudo contour cannot be suppressed by the technique described in Patent Literature 1 above, a pseudo contour can be suppressed by controlling the pixel values of the locally decoded image SIG9 before being filtered, based on the brightness change direction.

In addition, as described above, before the transformation/quantization unit 30A performs orthogonal transformation processing and quantization processing, the moving image encoding apparatus 1B causes the in-loop filter unit 80B to control the residual signal SIG6 for each target block detected by the detection unit 60, such that the residual signal SIG6 after quantization that is 0 if a conventional quantization algorithm is used takes a significant value of "1" or more after the transformation/quantization unit 30A performs orthogonal transformation processing and quantization processing. Therefore, it is not necessary to generate a high gradation image as the technique described in Patent Literature 2 above, and thus the increase in calculation cost can be suppressed.

In addition, the moving image encoding apparatus 1B causes the detection unit 60 to detect, as the above-described target block, a block whose block size is 32×32 or more, whose intra-block change value is larger than or equal to 1 and smaller than α, and whose edge value is larger than or equal to β. In addition, processing is performed by the control unit 70B for each block detected as a target block by the detection unit 60. Therefore, the detection unit 60 can detect a block in which change in pixel values is small, and the brightness smoothly changes, and the control unit 70B can perform processing on this block. Therefore, regarding a block in which change in pixel values is large and a block in which the brightness does not smoothly change, in other words, a block in which a pseudo contour is unlikely to occur, processing that is performed by the control unit 70B is reduced such that the calculation cost can be suppressed.

According to the above-described moving image decoding apparatus 100B, the following effect can be exerted.

In the moving image encoding apparatus 1B, as described above, before the transformation/quantization unit 30A performs orthogonal transformation processing and quantization processing, the residual signal SIG6 is controlled such that the residual signal SIG6 after quantization that is 0 if a conventional quantization algorithm is used takes a significant value of "1" or more after the transformation/quantization unit 30A performs orthogonal transformation processing and quantization processing. Therefore, control is performed such that, when the bit stream SIG2 is generated by the moving image encoding apparatus 1B, the residual signal SIG6 after quantization that is 0 if a conventional quantization algorithm is used takes a significant value of "1" or more after the transformation/quantization unit 30A performs orthogonal transformation processing and quantization processing. Therefore, if the moving image decoding apparatus 100B that receives the bit stream SIG2 generated by the moving image encoding apparatus 1B causes the entropy decoding unit 110A to decode the bit stream SIG2, and causes the inverse transformation/inverse quantization unit 120 to perform inverse quantization processing and inverse orthogonal transformation processing, it is possible to obtain the residual signal SIG103 that takes a significant value other than zero. Accordingly, a pseudo contour can be suppressed.

Fourth Embodiment

Figure 10:
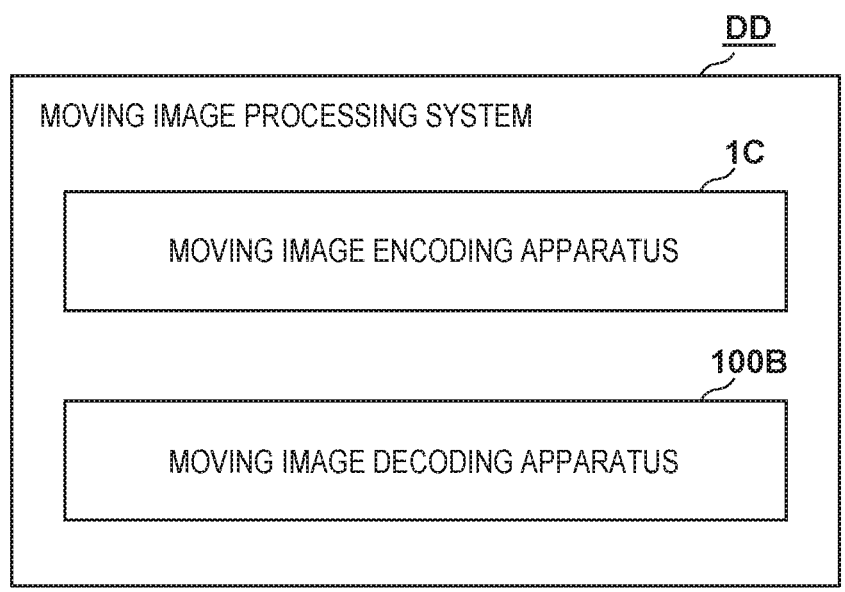
FIG. 10 is a block diagram of a moving image processing system according to an embodiment.

FIG. 10 is a block diagram of a moving image processing system DD according to a fourth embodiment of the present invention. The moving image processing system DD is different from the moving image processing system CC according to the third embodiment shown in FIG. 7 in that the moving image processing system DD includes a moving image encoding apparatus 1C in place of the moving image encoding apparatus 1B. Note that, in the moving image processing system DD, the same reference numerals are given to the same configuration elements as the moving image processing system CC, and a description thereof is omitted.

Figure 11:
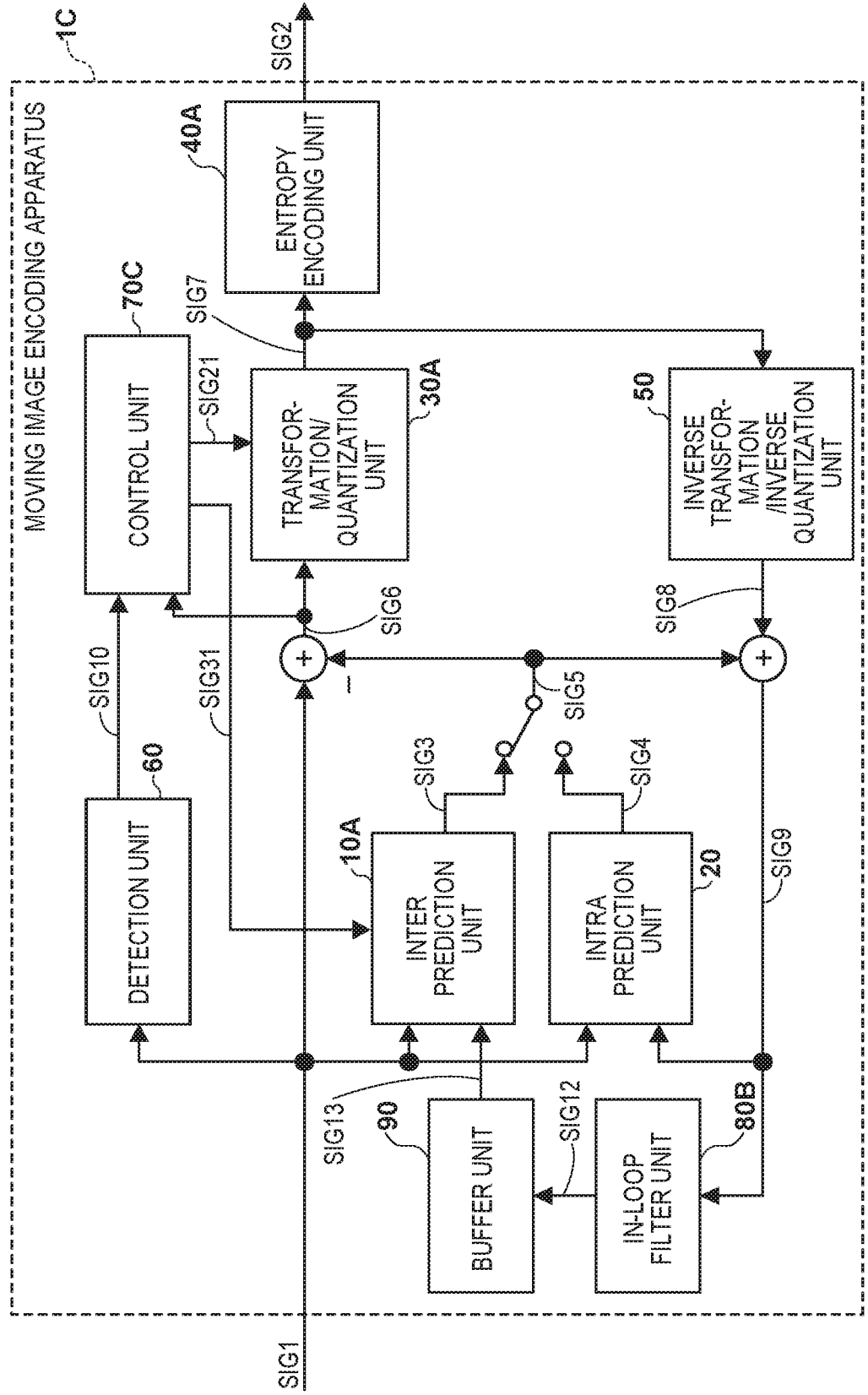
FIG. 11 is a block diagram of a moving image encoding apparatus according to an embodiment.

FIG. 11 is a block diagram of the moving image encoding apparatus 1C. The moving image encoding apparatus 1C is different from the moving image encoding apparatus 1B according to the third embodiment shown in FIG. 8 in that the moving image encoding apparatus 1C includes an inter prediction unit 10A in place of the inter prediction unit 10, and a control unit 70C in place of the control unit 70B. Note that, in the moving image encoding apparatus 1C, the same reference numerals are given to the same configuration elements as the moving image encoding apparatus 1B, and a description thereof is omitted.

A detection result SIG10 and a residual signal SIG6 are input to the control unit 70C. Regarding a target block to which intra prediction was applied when calculating a prediction image SIG5, similarly to the control unit 70B, this control unit 70C controls the residual signal SIG6 after quantization that is 0 if a conventional quantization algorithm is used, so as to take a significant value of "1" or more after the transformation/quantization unit 30A performs orthogonal transformation processing and quantization processing, and outputs the result as a control result SIG21. On the other hand, regarding a target block to which inter prediction was applied when calculating the prediction image SIG5, the cost value of rate distortion optimization in inter prediction is controlled such that unidirectional prediction is likely to be selected when inter prediction of this target block is performed, and the controlled cost value is output as a cost value SIG31.

An input image SIG1, a filtered and locally decoded image SIG13, and the cost value SIG31 are input to the inter prediction unit 10A. This inter prediction unit 10A determines an optimum mode for inter prediction based on the cost value SIG31, performs inter prediction in the determined mode using the input image SIG1 and the filtered and locally decoded image SIG13, and generates and outputs an inter prediction signal SIG3.

According to the above-described moving image encoding apparatus 1C, in addition to the above-described effect that can be exerted by the moving image encoding apparatus 1B, the following effect can be exerted.

The moving image encoding apparatus 1C causes the control unit 70C to control the residual signal SIG6 regarding a target block to which intra prediction was applied. In addition, regarding a target block to which inter prediction was applied, the control unit 70C controls the cost value of rate distortion optimization in inter prediction, such that unidirectional prediction is likely to be selected when inter prediction of this block is performed. Therefore, unidirectional prediction can be made likely to be selected in inter prediction, and a pseudo contour can be further suppressed.

Note that the present invention can be realized by storing, in a computer-readable non-transitory recording medium, the processing of the moving image encoding apparatuses 1, 1A, 1B, and 1C and the moving image decoding apparatuses 100, 100A, and 100B of the present invention, and causing the moving image encoding apparatuses 1, 1A, 1B, and 1C and the moving image decoding apparatuses 100, 100A, and 100B to read programs stored in this recording medium, and executing the programs.

Here, for example, a nonvolatile memory such as an EPROM or a flash memory, a magnetic disk such as a hard disk, a CD-ROM, or the like can be applied as the above-described recording medium. In addition, a program stored in this recording medium is read out and executed by a processor provided in the moving image encoding apparatuses 1, 1A, 1B, and 1C and the moving image decoding apparatuses 100, 100A, and 100B.

In addition, the above-described program may be transmitted from the moving image encoding apparatuses 1, 1A, 1B, and 1C or the moving image decoding apparatuses 100, 100A, and 100B in which the program is stored in a storage apparatus or the like, to another computer system via a transmission medium or using a transmission wave in the transmission medium. Here, the "transmission medium" for transmitting a program refers to a medium that has a function for transmitting information, for example, a network (communication network) such as the Internet and a communication line such as a telephone line.

In addition, the above-described program may be for realizing a portion of the above-described function. Furthermore, the program may be a program that can realize a portion of the above-described function in combination with a program already stored in the moving image encoding apparatuses 1, 1A, 1B, and 1C and the moving image decoding apparatuses 100, 100A, and 100B, or specifically, a so-called difference file (difference program).

The embodiments of the present invention are described above in detail with reference to the drawings, but specific configuration is not limited to the embodiments, and includes design and the like without departing from the gist of the present invention.

For example, in the above embodiments, after performing processing on the locally decoded image SIG9 before being filtered such that the change in brightness is regenerated using distribution of pixel value change, the in-loop filter units 80 and 80A apply an in-loop filter to the locally decoded image SIG9 before being filtered that went under this processing. However, there is no limitation thereto, and after an in-loop filter is applied to the locally decoded image SIG9 before being filtered, the processing may be performed on the locally decoded image SIG9 before being filtered to which the in-loop filter was applied, such that the change in brightness is regenerated using distribution of pixel value change.

In addition, in the above embodiments, the detection units 60 and 60A detect a target block using an intra-block change value and an edge value. However, there is no limitation thereto, and a target block may be detected using at least one of the intra-block change value, the edge value, and the variance values of the pixel values of the pixels of a target prediction block (intra-block variance value). In the case of using the intra-block variance value, the prediction target block is detected as a target block if the intra-block variance value is smaller than or equal to a threshold value, and the prediction target block is not detected as a target block if the intra-block variance value is larger than the threshold value.

In addition, in the above-described moving image encoding apparatus 1 according to the first embodiment, the transformation/quantization unit 30A and the above control unit 70B according to the third embodiment that have been described above may be applied in place of the transformation/quantization unit 30.

In addition, in the above-described moving image encoding apparatus 1 according to the first embodiment, the inter prediction unit 10A, the transformation/quantization unit 30A, and the control unit 70C according to the fourth embodiment that have been described above may be applied in place of the inter prediction unit 10 and the transformation/quantization unit 30.

In addition, in the above-described moving image encoding apparatus 1A according to the second embodiment, the transformation/quantization unit 30A and the control unit 70B according to the third embodiment that have been described above may be applied in place of the transformation/quantization unit 30.

In addition, in the above-described moving image encoding apparatus 1A according to the second embodiment, the inter prediction unit 10A, the transformation/quantization unit 30A, and the control unit 70C according to the fourth embodiment that have been described above may be applied in place of the inter prediction unit 10 and the transformation/quantization unit 30.

The present invention is not limited to the embodiments above, and various changes and modifications are possible without departing from the spirits and scope of the present invention. Therefore, in order to the scope of the present invention public, the following claims are attached.

The invention claimed is:

1. A moving image encoding apparatus that encodes a moving image and generates encoded data, comprising:
a detection unit configured to detect a target block from among blocks acquired by dividing the moving image;
an extraction unit configured to extract a brightness change direction for each block detected as the target block by the detection unit; and
an in-loop filter unit configured to control pixel values of a locally decoded image based on the brightness change direction extracted by the extraction unit, for each block detected as the target block by the detection unit,
wherein the detection unit is further configured to detect a prediction target block as the target block if at least one of the followings is met:
a difference between a largest value out of pixel values of pixels of the prediction target block and a smallest value out of the pixel values of the pixels of the prediction target block is larger than or equal to a first threshold value and smaller than a second threshold value,
when a pixel value difference between pixels adjacent to each other out of the pixels of the prediction target block is calculated, a total value of calculated pixel value differences is larger than or equal to a third threshold value, and
a dispersion value of the pixel values of the pixels of the prediction target block is smaller than or equal to a fourth threshold value.

2. The moving image encoding apparatus according to claim 1,
wherein the in-loop filter unit is further configured to add a random number on which the brightness change direction extracted by the extraction unit is reflected, to the pixel values of the locally decoded image.

3. The moving image encoding apparatus according to claim 1,
wherein the extraction unit is further configured to extract the brightness change direction for each block to which intra prediction or bidirectional prediction was applied, and
the in-loop filter unit is further configured to control the pixel values of the locally decoded image for each block to which intra prediction or bidirectional prediction was applied.

4. The moving image encoding apparatus according to claim 1,
wherein the detection unit is further configured to detect the target block for each block to which intra prediction or bidirectional prediction was applied,
the extraction unit is further configured to extract the brightness change direction for each block to which intra prediction or bidirectional prediction was applied, and that was detected as the target block by the detection unit, and
the in-loop filter unit is further configured to control the pixel values of the locally decoded image for each block to which intra prediction or bidirectional prediction was applied, and that was detected as the target block by the detection unit.

5. A moving image encoding apparatus that encodes a moving image and generates encoded data, comprising:
inter and intra prediction units configured to generate a prediction image for each of blocks acquired by dividing the moving image;
a detection unit configured to detect a prediction target block as a target block from among the blocks acquired by dividing the moving image;
a quantization unit configured to quantize a residual signal between the moving image and the prediction image generated by the inter or intra prediction units, for each of the blocks acquired by dividing the moving image; and
a level value control unit configured to control the residual signal for each block detected as the target block by the detection unit, before the quantization unit performs quantization, such that a value acquired by the quantization unit performing quantization is larger than or equal to 1,
wherein the detection unit is further configured to detect as the target block if at least one of the followings is met:
a difference between a largest value out of pixel values of pixels of the prediction target block and a smallest value out of the pixel values of the pixels of the prediction target block is larger than or equal to a first threshold value and smaller than a second threshold value,
when a pixel value difference between pixels adjacent to each other out of the pixels of the prediction target block is calculated, a total value of calculated pixel value differences is larger than or equal to a third threshold value, and
a dispersion value of the pixel values of the pixels of the prediction target block is smaller than or equal to a fourth threshold value.

6. The moving image encoding apparatus according to claim 5, wherein the level value control unit is further configured to control the residual signal regarding a block to which intra prediction was applied, and
control a cost value of rate distortion optimization in inter prediction regarding a block to which inter prediction was applied, such that unidirectional prediction is likely to be selected when inter prediction of the block is performed.

7. The moving image encoding apparatus according to claim 5,
wherein the level value control unit is further configured to control the residual signal regarding a block to which intra prediction was applied, and that was detected as the target block by the detection unit, and
control a cost value of rate distortion optimization in inter prediction regarding a block to which inter prediction was applied, and that was detected as the target block by the detection unit, such that unidirectional prediction is likely to be selected when inter prediction of the block is performed.

8. A moving image encoding method in a moving image encoding apparatus that encodes a moving image and generates encoded data, the method comprising:
detecting a target block from among blocks acquired by dividing the moving image;
extracting a brightness change direction for each block detected as the target block; and
controlling pixel values of a locally decoded image based on the extracted brightness change direction, for each block detected as the target block,
wherein, in the detecting, a prediction target block is detected as the target block if at least one of the followings is met:
a difference between a largest value out of pixel values of pixels of the prediction target block and a smallest value out of the pixel values of the pixels of the prediction target block is larger than or equal to a first threshold value and smaller than a second threshold value,
when a pixel value difference between pixels adjacent to each other out of the pixels of the prediction target block is calculated, a total value of calculated pixel value differences is larger than or equal to a third threshold value, and
a dispersion value of the pixel values of the pixels of the prediction target block is smaller than or equal to a fourth threshold value.

9. A moving image encoding method in a moving image encoding apparatus that encodes a moving image and generates encoded data, the method comprising:
generating a prediction image for each of blocks acquired by dividing the moving image;
detecting a prediction target block as a target block from among the blocks acquired by dividing the moving image;
quantizing a residual signal between the moving image and the generated prediction image, for each of the blocks acquired by dividing the moving image; and
controlling the residual signal for each block detected as the target block, before the quantization is performed, such that a value after the quantization is larger than or equal to 1,
wherein, in the detecting, the prediction target block is detected as the target block if at least one of the followings is met:
a difference between a largest value out of pixel values of pixels of the prediction target block and a smallest value out of the pixel values of the pixels of the prediction target block is larger than or equal to a first threshold value and smaller than a second threshold value,
when a pixel value difference between pixels adjacent to each other out of the pixels of the prediction target block is calculated, a total value of calculated pixel value differences is larger than or equal to a third threshold value, and
a dispersion value of the pixel values of the pixels of the prediction target block is smaller than or equal to a fourth threshold value.

10. A non-transitory computer readable storage medium including a program that is executed by a computer having one or more processors, and when executed by the one or more processors, causes the computer to:
detecting a target block from among blocks acquired by dividing the moving image;
extract a brightness change direction for each block detected as the target block; and
control pixel values of a locally decoded image based on the extracted brightness change direction, for each block detected as the target block,
wherein, in the detecting, a prediction target block is detected as the target block if at least one of the followings is met:
a difference between a largest value out of pixel values of pixels of the prediction target block and a smallest value out of the pixel values of the pixels of the prediction target block is larger than or equal to a first threshold value and smaller than a second threshold value,
when a pixel value difference between pixels adjacent to each other out of the pixels of the prediction target block is calculated, a total value of calculated pixel value differences is larger than or equal to a third threshold value, and
a dispersion value of the pixel values of the pixels of the prediction target block is smaller than or equal to a fourth threshold value.

11. A non-transitory computer readable storage medium including a program that is executed by a computer having one or more processors, and when executed by the one or more processors, causes the computer to:
generate a prediction image for each of blocks acquired by dividing a moving image;
detecting a prediction target block as a target block from among the blocks acquired by dividing the moving image;
quantize a residual signal between the moving image and the generated prediction image, for each of the blocks acquired by dividing the moving image; and
control the residual signal for each block detected as the target block, before the quantization is performed, such that a value after the quantization is larger than or equal to 1,
wherein, in the detecting, the prediction target block is detected as the target block if at least one of the followings is met:
a difference between a largest value out of pixel values of pixels of the prediction target block and a smallest value out of the pixel values of the pixels of the prediction target block is larger than or equal to a first threshold value and smaller than a second threshold value,
when a pixel value difference between pixels adjacent to each other out of the pixels of the prediction target block is calculated, a total value of calculated pixel value differences is larger than or equal to a third threshold value, and a dispersion value of the pixel values of the pixels of the prediction target block is smaller than or equal to a fourth threshold value.

* * * * *